US012620880B2

(12) United States Patent
Wurster et al.

(10) Patent No.: US 12,620,880 B2
(45) Date of Patent: May 5, 2026

(54) ROTOR DEVICE FOR AN ELECTRIC MOTOR AND METHOD FOR PRODUCING THIS ROTOR DEVICE

(71) Applicant: Dr. Ing. h.c. F. Porsche Aktiengesellschaft, Stuttgart (DE)

(72) Inventors: Peter Wurster, Wiggensbach (DE); Patrick Knecht, Stuttgart (DE); Johannes Lange, Dettenheim (DE); Florian Braunbeck, Stuttgart (DE); Tobias Engelhardt, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 342 days.

(21) Appl. No.: 18/188,605

(22) Filed: Mar. 23, 2023

(65) Prior Publication Data

US 2023/0318418 A1 Oct. 5, 2023

(30) Foreign Application Priority Data

Mar. 29, 2022 (DE) .......................... 102022107435.8

(51) Int. Cl.
$H02K\ 15/12$ (2025.01)
$H02K\ 7/04$ (2006.01)
(Continued)

(52) U.S. Cl.
CPC .............. *H02K 15/12* (2013.01); *H02K 7/04* (2013.01); *H02K 15/03* (2013.01); *H02K 15/165* (2013.01); *H02K 2201/09* (2013.01)

(58) Field of Classification Search
CPC .... H02K 15/03; H02K 15/035; H02K 15/165; H02K 15/12; H02K 15/121; H02K 7/04; H02K 1/27; H02K 1/276
See application file for complete search history.

(56) References Cited

U.S. PATENT DOCUMENTS 5,780,945 A 7/1998 Caviglia et al.
6,242,826 B1 * 6/2001 Saito ...................... G11B 17/03
(Continued)

FOREIGN PATENT DOCUMENTS

CN 100352143 C 11/2007
CN 106602809 A * 4/2017 ............. H02K 15/03
(Continued)

OTHER PUBLICATIONS

18188605_Feb. 11, 2025_CN_211670689_U_H.pdf (Year: 2025).*
(Continued)

*Primary Examiner* — Maged M Almawri
*Assistant Examiner* — Ahmed F Seck
(74) *Attorney, Agent, or Firm* — LEYDIG, VOIT & MAYER, LTD.

(57) ABSTRACT

A method for producing a rotor device, including providing a rotor shaft having at least one sheet metal packet joined to the rotor shaft. The at least one sheet metal packet includes magnetic units. The method includes performing a transfer molding process, in which the magnetic units are fixed in position in relation to the at least one sheet metal packet and at least one balancing disk is joined axially on the rotor shaft on at least one side of the at least one sheet metal packet such that a gap of a defined width is ensured between the at least one balancing disk and the at least one sheet metal packet. The gap is filled with a molding compound used for the transfer molding process. The method includes determining an imbalance of the rotor device and compensating the imbalance by removing material from the at least one balancing disk.

15 Claims, 3 Drawing Sheets

(51) Int. Cl.
    *H02K 15/03*      (2025.01)
    *H02K 15/165*      (2025.01)

(56)      References Cited

U.S. PATENT DOCUMENTS

| | | | | |
|---|---|---|---|---|
| 10,811,915 B2 * | 10/2020 | Faulhaber | .............. | H02K 1/278 |
| 2013/0082563 A1 | 4/2013 | Yoshida | | |
| 2014/0091649 A1 * | 4/2014 | Dragon | ................ | H02K 11/012 |
| | | | | 29/598 |

FOREIGN PATENT DOCUMENTS

| | | | | | |
|---|---|---|---|---|---|
| CN | 206180798 | U | | 5/2017 | |
| CN | 211670689 | U * | 10/2020 | ............... | H02K 1/17 |
| DE | 4423840 | A1 * | 1/1996 | ............. | H02K 15/03 |
| DE | 102017214567 | A1 * | 2/2019 | ............... | H02K 1/28 |
| DE | 102018208620 | A1 * | 12/2019 | ............... | H02K 1/32 |
| EP | 0381769 | B1 * | 5/1994 | ........... | H02K 1/2773 |
| EP | 3276793 | A1 | 1/2018 | | |
| FR | 2672344 | A1 * | 8/1992 | ........... | F04D 13/025 |
| JP | 2008199725 | A * | 8/2008 | ........... | B60L 3/0061 |
| KR | 20200093501 | A * | 8/2020 | ........... | H02K 15/165 |
| WO | 102015203018 | A1 * | 8/2016 | | |

OTHER PUBLICATIONS

18188605_Feb. 11, 2025_DE_102018208620_A1_H.pdf (Year: 2025).*
18188605_Feb. 11, 2025_KR_20200093501_A_H.pdf (Year: 2025).*
18188605_Feb. 14, 2025_DE_102017214567_A1_H.pdf (Year: 2025).*
DE102015203018A1_-_Translation.pdf (Year: 2025).*
18188605_Feb. 19, 2025_CN_106602809_A_H.pdf (Year: 2025).*
FR_2672344_A1-Translation.pdf (Year: 2025).*
18188605_Jul. 27, 2025_DE_4423840_A1_H.pdf (Year: 2025).*
18188605_Jul. 27, 2025_EP_0381769_B1_H.pdf (Year: 2025).*
18188605_Jul. 27, 2025_JP_2008199725_A_H.pdf (Year: 2025).*

* cited by examiner

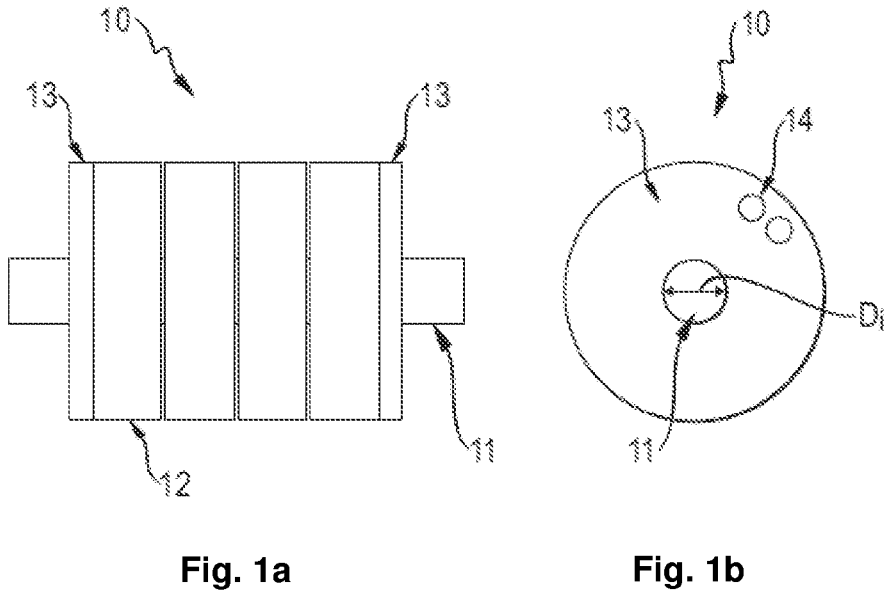
Fig. 1a
Prior art
Fig. 1b
Prior art
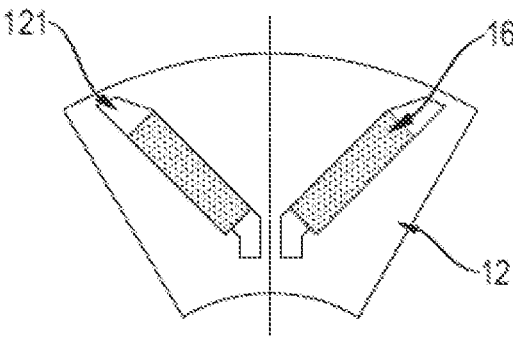
Fig. 2
Prior art

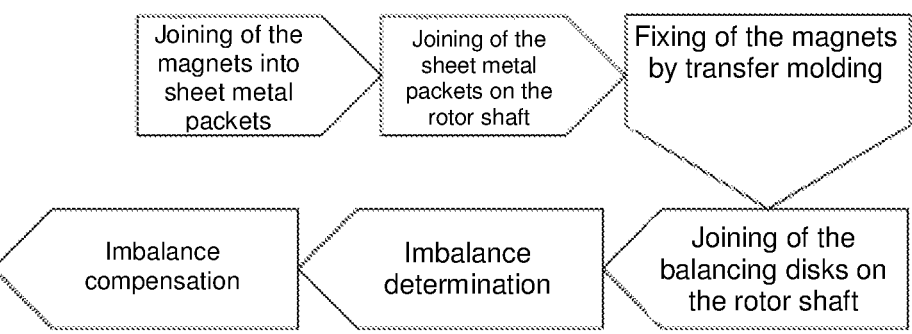
Fig. 3
Prior art
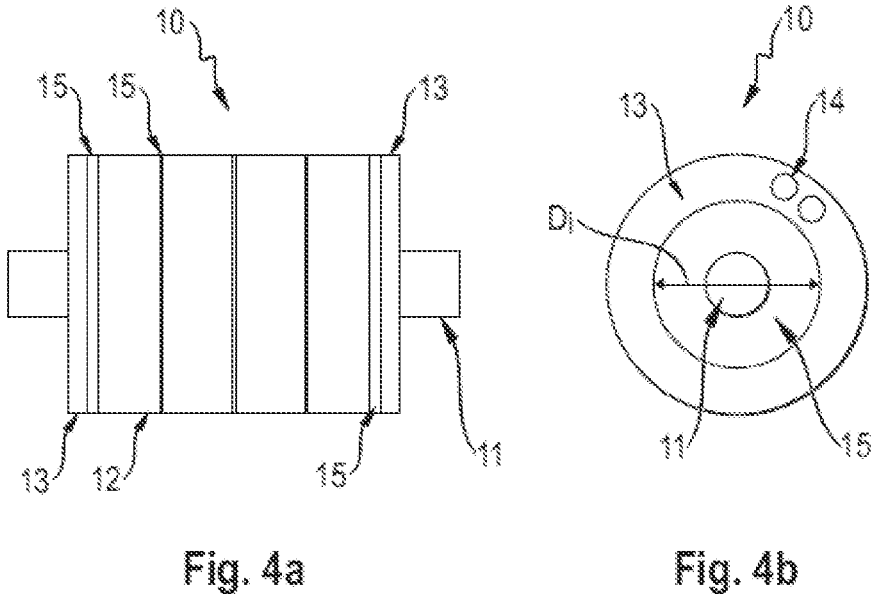
Fig. 4a                    Fig. 4b

ROTOR DEVICE FOR AN ELECTRIC MOTOR AND METHOD FOR PRODUCING THIS ROTOR DEVICE

CROSS REFERENCE TO RELATED APPLICATIONS

This application claims benefit to German Patent Application No. DE 10 2022 107 435.8, filed on Mar. 29, 2022, which is hereby incorporated by reference herein.

FIELD

The invention relates to a rotor device and a method of producing a rotor device.

BACKGROUND

Rotor devices for electric motors have sheet metal packets arranged around a rotor shaft in which magnetic units are provided. Due to the sometimes very high speeds of rotors in operation, it is necessary that any possible production-related imbalance of the rotor device be compensation up to a specified target value. For this purpose, balancing disks are used in the prior art in order to compensate for the imbalance of the rotor device by selectively removing material at certain locations on the balancing disk.

A rotor device 10 according to the prior art is shown in FIGS. 1a and 1b. FIG. 1a shows the rotor device 10 in a side view with a horizontal rotor shaft 11, on which four sheet metal packets 12 are arranged coaxially. In the axial direction of the rotor shaft 11, a balancing disk 13 is arranged next to the two outer sheet metal packets 12. The balancing disks 13 typically have a thickness of 5-10 mm, wherein their outer diameter approximately corresponds to the outer diameter of the sheet metal packets. They are either pressed onto the rotor shaft 11 as positively locking elements or screwed axially onto the rotor shaft 11 as positively locking elements by a retaining nut so that they contact the outer sheet metal packet 12 which faces them. Therefore, they must be made from a paramagnetic material in order to avoid a magnetic short circuit. Embodiments are also known in which the balancing disks 13 are glued to the sheet metal packets 12 for axial fixation. Such or similar rotor devices 10 are known from the following patent documents: EP 3 276 793 A1, U.S. Pat. No. 5,780,945 A, CN 100352143 C, US 2013/0082563 A1, and CN 206180798 U.

In order to compensate for the imbalance of the rotor device 10, material of the balancing disks 13 is removed at certain positions in the form of bores 14, as FIG. 1b indicates. FIG. 1b shows the rotor device 10 of FIG. 1a in a top plan view, i.e. a view of FIG. 1a rotated by 90°. Due to the type of attachment of the balancing disk 13 on the rotor shaft 11, by press fit or retaining nut, the inner diameter $D_i$ of the balancing disk 13 approximately corresponds to the diameter of the rotor shaft 11. The bores 14 are made in the radial direction relatively far outwards in order to make it necessary only to remove a small amount of material. Care must be taken to ensure that the balancing disk 13 is also not bored completely in order to avoid damage to the abutting sheet metal packet 12.

FIG. 2 shows a section of a sheet metal packet 12 of a rotor device 10, which is already known from the prior art, in a top plan view as in FIG. 1b. The cavities designated as pockets 121 can be seen, into which the magnetic units 16 are inserted. The magnetic units 16 comprise a permanent magnet or are configured as such. The magnetic units 16 thus inserted into the pockets 121 of the sheet metal packets 12 are referred to as buried magnetic units.

By contrast, there are also external magnetic units, which are mounted on the sheet metal packets 12 radially from the outside. Recesses can also be provided on the outside of the sheet metal packets 12 in order to receive the external magnetic units. In this respect, buried magnetic units and external magnetic units can be used alternatively or additionally in relation to one another.

The fixation of the magnetic units 16 takes place in both the external and buried magnetic units by means of transfer molding, in which a molding compound is injected into cavities like the pockets 121, in order to ensure the correct position, even at high speeds of the rotor device 10. Particularly in the case of external magnetic units, additional bandaging is used. Composite materials are typically used as the molding compound.

The production of a rotor unit 10 according to the prior art is thus carried out according to the method outlined in FIG. 3. First, the magnetic units are joined to the sheet metal packets before they are joined onto a rotor shaft. Unless stated otherwise, in the context of the application, an attachment of any kind will be described by the term "join." This can be a positive-locking attachment, for example, by means of a thread, a positive-locking attachment, for example by means of a press-fit, or another type of attachment.

After the sheet metal packets 12, including the magnetic units 16, are joined to the rotor shaft 11, the magnetic units 16 are fixed by transfer molding. Furthermore, the balancing disks 13 are added to the rotor shaft 11 and the imbalance of the rotor device 10 is determined. This imbalance is then compensated by removing material from the balancing disks 13, usually by way of bores 14.

It is disadvantageous in this method, however, that the balancing disks 13 must be produced from a highly stable and magnetically non-conductive and thus expensive material, for example Inconel®, due to the high speeds. In addition, a high amount of material required in relation to the material needed for the imbalance compensation. In addition, the production effort in material removal is comparatively high, because under no circumstances can a bore be drilled into a sheet metal packet 12 through the balancing disks 13 so as not to damage it.

SUMMARY

In an embodiment, the present disclosure provides a method for producing a rotor device for an electric motor, comprising: providing a rotor shaft having at least one sheet metal packet joined to the rotor shaft, wherein the at least one sheet metal packet comprises magnetic units; performing a transfer molding process, in which on the one hand the magnetic units are fixed in their position in relation to the at least one sheet metal packet and on the other hand at least one balancing disk is joined axially on the rotor shaft on at least one side of the at least one sheet metal packet in such a way that a gap of a defined width is ensured between the at least one balancing disk and the adjacent at least one sheet metal packet, which gap is filled with a molding compound used for the transfer molding process; determining an imbalance of the rotor device; and compensating the imbalance by removing material from the at least one balancing disk.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following:

FIG. 1a illustrates a rotor device according to the prior art in a side view;

FIG. 1b illustrates the embodiment of a rotor device shown in FIG. 1a in a top plan view;

FIG. 2 illustrates a detail view of a sheet metal packet according to the prior art in a top plan view;

FIG. 3 illustrates a flow chart of a method of producing a rotor device according to the prior art;

FIG. 4a illustrates a rotor device according to an embodiment of the invention in a side view;

FIG. 4b illustrates the rotor device according to an embodiment of the invention shown in FIG. 4a in a top plan view.

DETAILED DESCRIPTION

Figure 5:
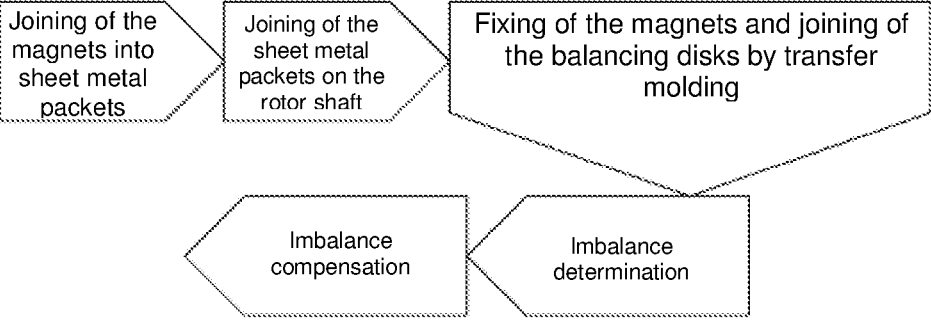
FIG. 5 illustrates a flow chart for a method according to an embodiment of the invention for producing a rotor device.

In an embodiment, the present invention provides a method for producing a rotor device that eliminates the aforementioned disadvantages. In some embodiments, the rotor device is intended for use in an electric motor, in particular for driving an electric or hybrid vehicle.

The features of advantageous methods according to embodiments of the invention described in the application are also considered as corresponding device features for the rotor device according to embodiments of the invention and vice versa.

According to a method according to an embodiment of the invention for producing a rotor device for an electric motor, a rotor shaft having at least one sheet metal packet joined to the rotor shaft is initially provided, wherein the at least one sheet metal packet comprises magnetic units. In a further step, a transfer molding process is performed, in which the magnetic units are fixed in their position in relation to the at least one sheet metal packet and at least one balancing disk (13) is joined axially on the rotor shaft on at least one side of the sheet metal packet in such a way that a gap of a defined width is ensured between the at least one balancing disk and the adjacent sheet metal packet, which gap is filled with the molding compound used for the transfer molding process. The gap is made as wide as needed so that no paramagnetic material for the balancing disk must be used.

The fixation of the magnetic units is carried out in that the molding compound is sprayed into the cavities provided in the sheet metal packet in order to receive the magnetic units in the transfer molding process. This is an operation as is already known to the person skilled in the art from the prior art as described above; therefore, it will not be discussed further at this point. The joining of the balancing disk on the rotor shaft during the transfer molding process is accomplished by the balancing disk being fixed to the rotor shaft and then surrounded by the injected molding compound. As soon as the molding compound has cured, the balancing disk is at least partially positively enclosed by the molding compound and preferably fixedly connected to it by adhesion, whereby the position of the balancing disk is also fixed. The molding compound can be injected in such a way that the balancing disk is axially gripped from both sides or only remains between the balancing disk and the sheet metal packet. In any case, the provided gap between the balancing disk and the sheet metal packet is filled in by the molding compound. Fiber composite is preferably used as the material for this purpose.

In a further method step, the imbalance of the rotor device is determined, and the rotor device is subsequently balanced by removing material from the balancing disk.

By taking into account a gap filled with molding compound between the balancing disk and the sheet metal packet in a method according to an embodiment of the invention, expensive paramagnetic materials do not need to be used; rather, favorable materials can also be used. Thus, the cost of the method can be reduced without reducing the quality of the final product.

The removal of material is preferably carried out by providing bores in the balancing disk, particularly preferably in the axial direction, i.e. parallel to the rotor shaft. The imbalance-compensating material removal is influenced by the diameter and depth of the bore on the one hand and by the position of the bore on the balancing disk on the other hand.

Embodiments in which the material is removed from the balancing plate for balancing by bores are preferred when the bores are made through the entire axial thickness of the balancing plate. The gap between the balancing disk and the sheet metal packet allows for drilling through the entire thickness of the balancing disk so as to remove material without risking damage to a sheet metal packet. This can reduce the axial thickness of the balancing disk with the same imbalance reduction potential, thereby conserving material in order to reduce costs. In addition, a weight reduction of the rotor device can also be achieved.

In an advantageous method according to an embodiment of the invention, the gap has a width of between 1 mm and 5 mm, particularly preferably 2 mm. Too wide a gap will result in excessive material usage of molding compound, while too small a width can result in damage to the sheet metal packets by providing the bores in the balancing disk.

An embodiment of the invention in which an inner diameter of the balancing disk is significantly larger than the diameter of the rotor shaft at the axial position at which the balancing disk is provided on the rotor shaft is further advantageous. This allows the amount of material to be used for the balancing disk to be further reduced and the costs as well as the weight of the rotor device to be further reduced. In such an embodiment, the inner region of the balancing disk, i.e. the region between balancing disk and rotor shaft, would also be filled in by the molding compound, whereby a positively locking connection between the molding compound and balancing disk is produced in the radial direction.

In an advantageous embodiment of the invention, two balancing disks are provided on the rotor shaft, wherein one is arranged on the one side of the at least one sheet metal packet and the other on the opposite side of the at least one sheet metal packet. Thus, a symmetrical arrangement can be created, which simplifies the balance of the rotor device, because on both sides a compensation of the imbalance can be performed in the axial direction.

Preferably, a further method step is provided in which the rotor device is bandaged, wherein the bandaging additionally fixes the at least one balancing disk in the axial direction. By means of the balancing disk fixed in this way, the risk of the balancing disk detaching from the molding compound in the axial direction can be reduced, and thus the safety of the rotor device can be increased.

In an advantageous embodiment of the invention, a molding compound is used for the transfer molding process, which compound has a strongly adhesive effect at least in conjunction with the balancing disk. The molding compound also functions as a type of glue between the balancing disk and the adjacent sheet metal packet due to its adhesive effect. Thus, an even more secure fixation of the disk on the rotor shaft can be ensured.

The rotor device according to an embodiment of the invention comprises a rotor shaft, at least one metal packet with magnetic units, and at least one balancing disk arranged axially on the rotor shaft. The magnetic units are fixed in their position in relation to the at least one sheet metal packet by means of transfer molding and the at least one balancing disk is joined on the rotor shaft by means of transfer molding, and wherein a gap is provided between the sheet metal packet and the balancing disk, which gap is filled by a molding compound used for the transfer molding. The gap is designed to be wide enough that no paramagnetic material must be used for the balancing disk.

The advantageous embodiments of the invention defined by method features in relation to methods according to embodiments of the invention are also transferable to devices according to embodiments of the invention by means of device features formulated accordingly. The obtained advantageous devices according to embodiments of the invention therefore also constitute part of the disclosure of this application.

In addition, methods according to embodiments of the invention and devices according to embodiments of the invention as well as advantageous aspects of embodiments of the invention are explained in further detail based on the accompanying figures.

FIGS. 1a to 3 outline a rotor device 10 known from the prior art and a method for producing it.

FIG. 4a shows a rotor device 10 according to an embodiment of the invention in a side view. In particular, the differences to the rotor device 10 shown in FIG. 1a according to the prior art will be discussed below. As with the rotor device according to FIG. 1a, the rotor device according to an embodiment of the invention also comprises a rotor shaft 11 on which four sheet metal packets 12, which are round in cross-section, are joined. Magnetic units 16 are provided within the sheet metal packets 12, as shown in further detail in FIG. 2 and is known in the prior art.

Balancing disks 13 are provided on the axial outer surfaces of the outer sheet metal packets 12 in order to compensate for a possible imbalance of the rotor unit 10. Molding compound 15 is provided between the individual sheet metal packets 12 as well as between the outer sheet metal packets 12 and the balancing disks 13 adjacent thereto, which compound is injected at these locations in the course of a transfer molding process. The balancing disks 13 are positively locked by the molding compound 15 on the rotor shaft 11 and fixed by an adhesive effect of the molding compound 15. During the same transfer molding process, the magnetic units 16 are also fixed in the pockets 121 of the sheet metal packets 12, in which the cavities around the magnetic units 16 are also filled with molding compound 15.

The gap filled with molding compound 15 between the outer sheet metal packets 12 and the balancing disk 13 is several millimeters, for example approximately 2 mm, and spaces the balancing disks 13 from the sheet metal packets 12 and thus from the magnetic units 16. Due to the sufficient spacing, the balancing disks 13 no longer need to be produced from a paramagnetic and thus expensive material. FIG. 4b shows the rotor device 10 according to an embodiment of the invention of FIG. 4a in a top plan view. By contrast to the prior art shown in FIG. 1b, the inner diameter $D_i$ of the balancing disk 13 is significantly larger than the diameter of the rotor shaft 11. The region in the radial direction between the rotor shaft 11 and the balancing disk 13 is filled in by the molding compound 15 such that the balancing disk 13 is fixed to the rotor shaft 11 without any play. In the embodiment shown, there is thus a positive seal between the molding compound 15 and the balancing disk 13, which fixes the balancing disk 13 radially and axially in the direction of the sheet metal packets 12. Embodiments are also possible in which the molding compound 15 comprises the balancing disk 13 in the axial direction from both sides and a complete positive seal is thus implemented.

In order to compensate for the imbalance of the rotor device 10, bores 14 are provided in the balancing disk 13 in order to selectively remove material and compensate the imbalance. In this way, the production-related initial imbalances of the rotor device 10 in particular can be compensated. The bores 14 can be provided through the entire thickness of the balancing disks 13 without risking damage to the adjacent sheet metal packet 12 due to the gap between the sheet metal packets 12 and the balancing disks 13, which gap is filled with the molding compound 15. Thus, more material can be removed per bore than in the prior art, in which the bores 14 cannot be made through the entire thickness so as not to damage the sheet metal packet 12 directly abutting the balancing disk 13. Thus, it can be achieved that a thinner balancing disk 13 can be used for the same imbalance reduction potential, thereby saving material.

The larger inner diameter $D_i$ of the balancing disk 13 compared to the prior art also results in a significantly material reduction in the balancing disk 13. Because the bores 14 are generally applied to the outer edge of the balancing disk 13 due to the greater impact on the imbalance, the possibility of imbalance reduction is also not affected by the greater inner diameter $D_i$.

FIG. 5 shows a schematic flow chart of a method according to an embodiment of the invention. After joining the magnetic units 16 in the sheet metal packets 12 and joining the sheet metal packets 12 on the rotor shaft 11, the magnetic units 16 in the corresponding pockets 121 of the sheet metal packets 12 can be fixed by transfer molding. In the same transfer molding process, the balancing disks 13 are fixed to the rotor shaft, wherein a defined gap between the sheet metal packets 12 and the balancing disk 13 is ensured. The gap is completely filled with the molding compound. Subsequently, the imbalance, here in particular the initial imbalance in relation to production, of the rotor device 10 formed by the previously performed steps is determined, and this is compensated by material removals on the balancing disks 13, preferably by bores 14.

As already stated, the advantages of this method are the possibility of using thinner and less material-intensive balancing disks 13. In addition, other, more favorable materials can be used compared to the prior art.

In a further method step, a bandaging of the rotor device can take place, wherein the balancing disks can be further fixed in the axial direction by the bandaging.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for producing a rotor device for an electric motor, comprising:

providing a rotor shaft having at least one sheet metal packet joined to the rotor shaft, wherein the at least one sheet metal packet comprises magnetic units, performing a transfer molding process, in which the magnetic units are fixed in their position in relation to the at least one sheet metal packet and at least one balancing disk is joined axially on the rotor shaft on at least one side of the at least one sheet metal packet in such a way that a gap of a defined width is ensured between the at least one balancing disk and the adjacent at least one sheet metal packet, the gap being filled with a molding compound used for the transfer molding process, wherein, at at least one radial position, the molding compound contacts both the at least one balancing disk and the adjacent at least one sheet metal packet, determining an imbalance of the rotor device, and compensating the imbalance by removing material from the at least one balancing disk.

2. The method according to claim 1, wherein the defined width of the gap is between 1 mm and 5 mm.

3. The method according to claim 1, wherein an inner diameter of the at least one balancing disk is significantly larger than the diameter of the rotor shaft at an axial position at which the at least one balancing disk is provided.

4. The method according to claim 3, further comprising bandaging the rotor device, wherein the bandaging additionally fixes the at least one balancing disk in the axial direction.

5. The method according to claim 3, wherein the molding compound fills a space between the inner diameter of the at least one balancing disk and the diameter of the rotor shaft at the axial position at which the at least one balancing disk is provided.

6. The method according to claim 1, wherein two balancing disks are provided on the rotor shaft, wherein one balancing disk is arranged on one side of the at least one sheet metal packet and the other balancing disk is arranged on an opposite side of the at least one sheet metal packet.

7. The method according to claim 1, wherein the removal of the material is carried out by providing bores.

8. The method according to claim 7, wherein the bores are drilled through an entire thickness of the at least one balancing disk.

9. The method according to claim 7, wherein the bores are parallel to the rotor shaft.

10. The method according to claim 1, wherein the molding compound is used in the transfer molding process, and wherein the molding compound has an adhesive effect in conjunction with the at least one balancing disk.

11. The method according to claim 10, wherein the molding compound positively locks the at least one balancing disk to the rotor shaft based on the adhesive effect.

12. The method according to claim 1, wherein the defined width of the gap is 2 mm.

13. The method according to claim 1, wherein performing the transfer molding process further comprises injecting the molding compound into the gap such by that same injection, the molding compound adheres the at least one balancing disk to the adjacent at least one sheet metal packet.

14. The method according to claim 1, wherein at each radial position that the molding compound contacts the at least one balancing disk, the molding compound contacts the adjacent at least one metal packet.

15. A rotor device, comprising:

a rotor shaft, at least one sheet metal packet with magnetic units joined on the rotor shaft, and at least one balancing disk arranged axially on the rotor shaft, wherein the magnetic units are fixed in their position in relation to the at least one sheet metal packet by transfer molding and the at least one balancing disk is joined on the rotor shaft by transfer molding, wherein a gap is provided between the at least one sheet metal packet and an adjacent at least one balancing disk, the gap being filled by a molding compound used for the transfer molding, and wherein, at at least one radial position, the molding compound contacts both the at least one balancing disk and the adjacent at least one sheet metal packet.

\* \* \* \* \*